United States Patent Office 3,420,687
Patented Jan. 7, 1969

3,420,687
METHOD OF INCREASING THE GRINDING EFFICIENCIES OF MINERALS AND CEMENT
Frank G. Serafin, Peabody, Mass., assignor to W. R. Grace & Co., Cambridge, Mass., a corporation of Connecticut
No Drawing. Filed May 10, 1965, Ser. No. 454,666
U.S. Cl. 106—102     9 Claims
Int. Cl. C04b 7/54; C04b 7/58

ABSTRACT OF THE DISCLOSURE

In the grinding of a mineral or cement (e.g., portland cement), a urea compound is interground with the mineral or cement to increase the efficiency of the grinding operation. Pack set of the resulting ground material is also inhibited. The urea compound can be urea, acetyl urea or diacetyl urea.

---

This invention relates to grinding minerals and more particularly to the use of an additive for improving the grinding efficiency and pack set characteristics of minerals.

In the processing of minerals, either in the unprocessed or semiprocessed state, a grinding operation is generally necessary to reduce the particular mineral to a relatively small particle size. It is desirable in this grinding step to have as efficient an operation as possible, that is, to reduce the particular mineral to the desired particle size at a relatively rapid rate.

Cleavage of the particles during grinding of the minerals exposes fresh or nascent surfaces which have high energies due probably to the breaking of ionic bonds. The surface forces of the ground particles persist for some time after grinding and lead to compaction or pack set and/or poor fluidity if they are not reduced. Mineral particles when compacted by vibration, e.g., when transported in a hopper car, often become semirigid and will not flow until considerable mechanical effort has been applied to break up the compaction. On the other hand, undue reduction or the complete absence of surface forces is undesirable because the finely ground mineral becomes excessively fluid.

The term "pack set" as used herein is intended to refer to the agglomeration or adhesion of particles by, e.g., storing or transporting in bulk. Cohesion results from surface forces, the majority of which are created during the grinding of the minerals. "Pack set index" is a relative term which numerically indicates how prone a particular material is to start flowing after it is stored or transported in bulk. "Pack set index ratio" is the relative pack set index of the untreated sample compared to the treated sample. This ratio is used to permit comparison between different samples of the mineral. A grinding aid is a material which assists in grinding of minerals, either by increasing the rate of production or by increasing the fineness of the particles at the same rate of production without having adverse effects on any of the properties of the ground product.

Pack set index is determined in the following manner: 100 grams of the mineral is placed in a 250 milliliter Erlenmeyer flask set on top of a variable vibrator. The flask containing a mineral is vibrated 15 seconds after which time it is removed from the vibrator and fed into a jig with the axis of the flask lying horizontally. The flask is then rotated about its axis until the mineral which is compacted on the bottom of the flask collapses. The flask is twisted by turning at 180° angles at approximately 100 twists per minute. The number of 180° twists required for the mineral sample to collapse established the pack set index. Thus the greater the energy requirement to break up the bed, the higher will be the pack set index.

A novel additive has now been found which will function as a grinding aid and a pack set inhibitor for minerals. The novel additive of the present invention comprises a compound urea. The term "urea compound," as used herein, is intended to refer to urea, derivatives of urea, precursors of urea which form urea in situ, and urea reaction products. Preferred additives within the scope of the present invention include urea

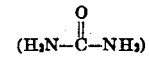

acetyl urea

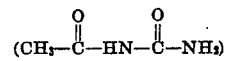

and diacetyl urea

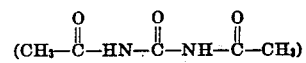

The additive is interground with the mineral in the grinding mill to provide increased grinding efficiency as well as other advantageous results, e.g., inhibiting pack set of bulk stored materials.

It has also been found that the novel additive of the present invention also serves to provide fluidity to the ground minerals when they are being transported by conveying systems, particularly by pneumatic air systems.

The additives of the present invention are employed in either dry or liquid form. For convenience, the additive is in a water solution to permit accurate metering into the mineral stream. The addition is accomplished either prior to the grinding or the additive is introduced into the grinding mill simultaneously with the mineral. If the additive is employed merely for reduction of pack set and fluidizing purposes, it is added at any convenient point in the processing.

The additive of the present invention is employed preferably as the sole grinding aid, but it should be understood that it can also be employed as a mixture of one or more grinding aids, or in admixture with cement additives other than grinding aids.

The additive is employed effectively over a relatively wide range. The preferred range is 0.001 to 1% and more preferably 0.005 to 0.1% based on the weight of the mineral. Additives in excess of 1% are also employed, and the amount of additive used is limited only by the desired surface area and fluidity of the finished product.

The term "mineral" as used herein is intended to refer to naturally occurring inorganic minerals, such as phosphate rock and taconite and partially processed minerals such as concentrated iron ore. As examples of other minerals which can be processed with the additive of the present invention, mention may be made of beryllium oxide, limestone, gypsum, clays, and bauxite.

The grinding aids of the present invention are particularly preferred for use with cement, particularly portland cement.

Portland cement represents a class of hydraulic cements and is comprised essentially of two calcium silicates and lesser amounts of calcium aluminate. These cements are produced by heating an intimate mixture of finely divided, calcareous material (limestone) and argillaceous material (clay) to fusion to form a clinker. The clinker is ground with the addition of about 5% gypsum, or some other form of calcium sulfate, to obtain the desired setting qualities in the finished cement. It is to the clinker that the novel additive of this invention is preferably added to increase grinding efficiency and to inhibit subsequent pack set in the finished cement.

Table 1 shows the results of intergrinding type 1 portland cement with urea at various concentrations. The grinding was carried out in a laboratory steel ball mill at a temperature of 220° F. for 2000 revolutions.

TABLE 1

| Additive | Amount of additive (solids on solids) | Blaine surface area (sq. cm./g.) |
|---|---|---|
| Blank | | 3,015 |
| Commercial grinding aid | 0.02 | 3,140 |
| Urea | 0.01 | 3,160 |
| Do | 0.015 | 3,220 |

The results of Table 1 show that urea is an effective grinding aid and is even more effective than a commercial grinding aid when used at a level lower than that of the commercial grinding aid.

Table 2 shows air entrainment data of the additive of this invention compared with a blank. The method used to determine air entrainment was ASTM C185.

TABLE 2

| Additive | Amount of Additive (solids on solids) | W/C ratio | Percent air entrained |
|---|---|---|---|
| Blank | | 0.70 | 8.7 |
| Urea | 0.01 | 0.67 | 8.8 |
| Do | 0.015 | 0.67 | 8.8 |

The results of Table 2 indicate that grinding cement with urea does not result in an increase in entrained air.

Table 3 shows that the use of urea as an additive in cement does not appreciably increase shrinkage of the cements. The shrinkage test used was ASTM C157. The W/C (water/cement) ratio was 0.40.

TABLE 3

| Additive | Amount of additive (solids on solids) | Length, inches | | | Percent change* |
|---|---|---|---|---|---|
| | | 7 days | 28 days | 3 months | |
| Blank | | 11.6601 | 11.6532 | 11.6495 | 0.091 |
| Commercial grinding aid | 0.02 | 11.6300 | 11.6211 | 11.6170 | 0.112 |
| Urea | 0.01 | 11.6360 | 11.6292 | 11.6252 | 0.093 |

*Percent change = $100 \times \frac{(7 \text{ day length} - 3 \text{ month length})}{7 \text{ day length}}$ While the additive of the present invention is described primarily in terms of grinding cement clinker, satisfactory results are obtained when the additive is utilized in grinding other minerals as described heretofore.

What is claimed is:

1. The method which comprises intergrinding a solid material selected from the group consisting of minerals and portland cement with a urea compound selected from the group consisting of urea, acetyl urea and diacetyl urea, the amount of said urea compound employed being sufficient to increase grinding efficiency.

2. The method as defined in claim 1 wherein said compound is added to said solid material prior to introducing the solid material into the grinding zone.

3. The method as defined in claim 1 wherein said solid material is cement.

4. The method as defined in claim 1 wherein said compound is present at a level of about 0.001 to 1% by weight based on the weight of said solid material.

5. The method as defined in claim 1 wherein said compound is urea.

6. The method as defined in claim 1 wherein said compound is acetyl urea.

7. The method as defined in claim 1 wherein said compound is diacetyl urea.

8. The method of increasing the efficiency of grinding a portland cement clinker comprising intergrinding with said clinker about 0.001 to 1.0% by weight, based on the weight of said clinker, of a urea compound selected from the group consisting of urea, acetyl urea and diacetyl urea.

9. The method of claim 8 wherein said compound is urea.

References Cited

UNITED STATES PATENTS

| 1,824,854 | 9/1931 | White | 106—90 |
| 2,959,489 | 11/1960 | Wagner | 106—90 |

JAMES E. POER, *Primary Examiner.*

U.S. Cl. X.R.

106—90, 97, 314